(12) United States Patent
Maemura et al.

(10) Patent No.: US 9,226,340 B2
(45) Date of Patent: Dec. 29, 2015

(54) HEATING DEVICE

(71) Applicant: SANDEN CORPORATION, Isesaki (JP)

(72) Inventors: Yoshinobu Maemura, Isesaki (JP); Kazuyasu Ushigome, Isesaki (JP)

(73) Assignee: SANDEN CORPORATION, Gunma (JP)

(*) Notice: Subject to any disclaimer, the term of this patent is extended or adjusted under 35 U.S.C. 154(b) by 0 days.

(21) Appl. No.: 14/400,328

(22) PCT Filed: May 8, 2013

(86) PCT No.: PCT/JP2013/062921
§ 371 (c)(1),
(2) Date: Nov. 10, 2014

(87) PCT Pub. No.: WO2013/168734
PCT Pub. Date: Nov. 14, 2013

(65) Prior Publication Data
US 2015/0129576 A1    May 14, 2015

(30) Foreign Application Priority Data

May 10, 2012 (JP) ................................. 2012-108324

(51) Int. Cl.
H05B 1/02        (2006.01)
B60H 1/22        (2006.01)

(52) U.S. Cl.
CPC .............. *H05B 1/02* (2013.01); *B60H 1/2218* (2013.01); *B60H 1/2221* (2013.01); *H05B 1/0236* (2013.01); *B60H 2001/2231* (2013.01);

(Continued)

(58) Field of Classification Search
CPC .......... H05B 1/02; H05B 3/008; H05B 3/009; H05B 1/0238; H05B 3/0042
USPC .......... 219/494, 497, 202, 507, 398; 392/347, 392/350, 360, 373
See application file for complete search history.

(56) References Cited

U.S. PATENT DOCUMENTS 4,197,581 A * 4/1980 Watrous et al. ................. 700/90
6,665,492 B1 * 12/2003 Garcia et al. ................... 392/383

(Continued)

FOREIGN PATENT DOCUMENTS

JP    61-122453    6/1986
JP    10-157446    6/1998

(Continued)

Primary Examiner — Mark Paschall
(74) Attorney, Agent, or Firm — Cozen O'Connor

(57) ABSTRACT

Heating device includes: heater (2) with heating portion (6) generating heat by energization; housing (4) contains the heating portion and forms passage (18) for a heating medium between the housing and the heating portion; temperature detection means (26) detects, in the passage, temperature (T) inside the housing due to heat of the heating medium and the heating portion; and energization controlling means (40) for turning energization of the heater on/off depending on the temperature detected inside the housing. Energization of the heater is turned off to put the heater in an energization standby state if temperature detected inside the housing is equal to or greater than a first specified threshold (TS1), and is turned off to put the heater in an energization complete stop state if the temperature detected inside the housing in the energization standby state is equal to or greater than a second specified threshold (TS2).

1 Claim, 5 Drawing Sheets

(52) U.S. Cl.
CPC . *B60H2001/2256* (2013.01); *B60H 2001/2262* (2013.01)

(56) References Cited

U.S. PATENT DOCUMENTS 7,312,420 B2 * 12/2007 Smith ........................... 219/216

7,472,695 B2 * 1/2009 Prust et al. .................... 123/549

FOREIGN PATENT DOCUMENTS

| JP | 2000-35248 | 2/2000 |
|---|---|---|
| JP | 2002-343538 | 11/2002 |

* cited by examiner

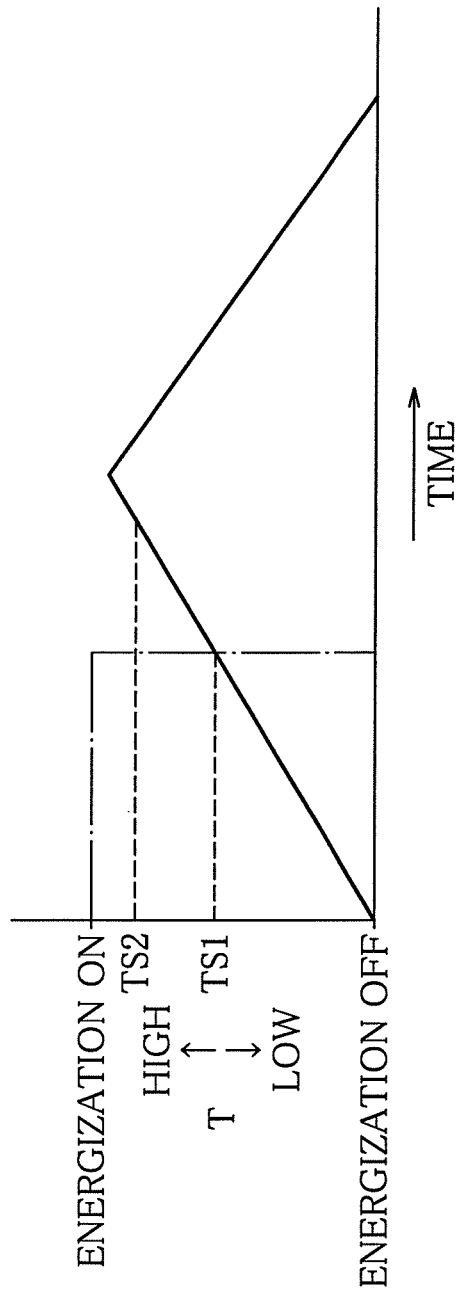

HEATING DEVICE

RELATED APPLICATIONS

This is a U.S. National Phase Application under 35 USC 371 of International Application PCT/JP2013/062921 filed on May 8, 2013.

This application claims the priority of Japanese application no. 2012-108324 filed May 10, 2012, the entire content of which is hereby incorporated by reference.

TECHNICAL FIELD

The present invention relates to heating devices, and particularly to a heating device including a housing which forms a passage for a heating medium between the housing and a heating portion of a heater.

BACKGROUND ART

It is known that a heating device of this kind includes a heater having a heating portion which generates heat by energization; a housing which contains the heating portion and forms a passage for a heating medium between the housing and the heating portion; a energization controlling means for detecting the temperature of the heating medium in the passage and turning on and off the energization of the heater depending on the detected temperature of the heating medium.

Patent Document 1 discloses a protective device for protecting a water heater for electric vehicles. The protective device is provided with a heating protection means including: a temperature determination means for determining whether or not the temperature of the water heater is higher than a designated temperature based on a value detected with a temperature sensor for detecting temperature of the water heater; an off-instruction means for turning off the switch of the water heater when the temperature of the water heater is higher than the designated temperature according to a result determined by the temperature determination means; and an off-holding means for controlling the off-instruction means so as to hold the off-state of the switch when the temperature of the water heater remains higher than the designated temperature.

PRIOR ART DOCUMENT

Patent Document

Patent Document 1: Japanese Patent No. 3369881

SUMMARY OF THE INVENTION

Problems to be Solved by the Invention

When a heating medium exists in the passage, the temperature of the heating medium is controlled within a proper range by the energization controlling means for turning on/off the energization of the heater. Thus, the temperature of the heater does not abnormally rise.

On the other hand, when no or little heating medium exists in the passage due to non-supply of the heating medium to the passage, a leakage of the heating medium from the passage or other reasons, there is no or little heating medium for transferring heat from the heater. If this happens, the heating device can undergo accidental heating of an empty passage, leading to a trouble that the temperature of the heater abnormally rises.

The heating protection means of Patent Document 1 described above is disadvantageously incapable of distinguishing between a state when a heating medium exists in the passage and a state when no or little heating medium exists in the passage. For that reason, the heating protection means can be unable to detect accidental heating of an empty passage in the heating device, leading to an occurrence of smoke or fire in the heating device.

The present invention has been made based on the above-mentioned circumstances, and an object of the present invention is to provide a heating device capable of detecting accidental heating of an empty passage with high accuracy and securely preventing an occurrence of smoke or fire so as to improve reliability of the heating device.

Means for Solving the Problems

In order to achieve the above-mentioned object, a heating device according to the present invention includes: a heater having a heating portion which generates heat by energization; a housing which contains the heating portion and forms a passage for a heating medium between the housing and the heating portion; a temperature detection means which detects in the passage, temperature inside the housing due to heat of the heating medium and the heating portion; and an energization controlling means for turning on and off the energization of the heater depending on the temperature inside the housing detected by the temperature detection means. The energization controlling means turns off energization of the heater to put the heater in an energization standby state if temperature inside the housing detected by the temperature detection means is equal to or greater than a first specified threshold. The energization controlling means continuously turns off energization of the heater to put the heater in an energization complete stop state if the temperature inside the housing detected in the energization standby state is equal to or greater than a second specified threshold.

Preferably, the energization controlling means should turn on energization of the heater to put the heater in an energization resuming state if the temperature inside the housing detected in the energization standby state is equal to or smaller than a third specified threshold.

Advantageous Effects of the Invention

According to the present invention, a heating device that achieves high reliability can be provided because a temperature range between the first threshold and the second threshold is designated as a range for determining heating of an empty passage, and in the standby state for energization of the heater, the energization controlling means distinguishes accidental heating of an empty passage in the heating device from normal temperature control through the heater so that the heating device promptly detects accidental heating of an empty passage with high accuracy and prevents reliably an occurrence of smoke or fire while the energization controlling means performs normal energization control of the heater.

BRIEF DESCRIPTION OF THE DRAWINGS

FIG. 5 is a diagram showing a relationship between the energization status of the heater and a temperature T detected with the temperature sensor on a time-series basis while the inverter of FIG. 1 performs a process for correcting the abnormally high-temperature of the heater.

MODE FOR CARRYING OUT THE INVENTION

A heating device in accordance with an embodiment of the present invention will now be described with reference to the attached drawings.

Figure 1:
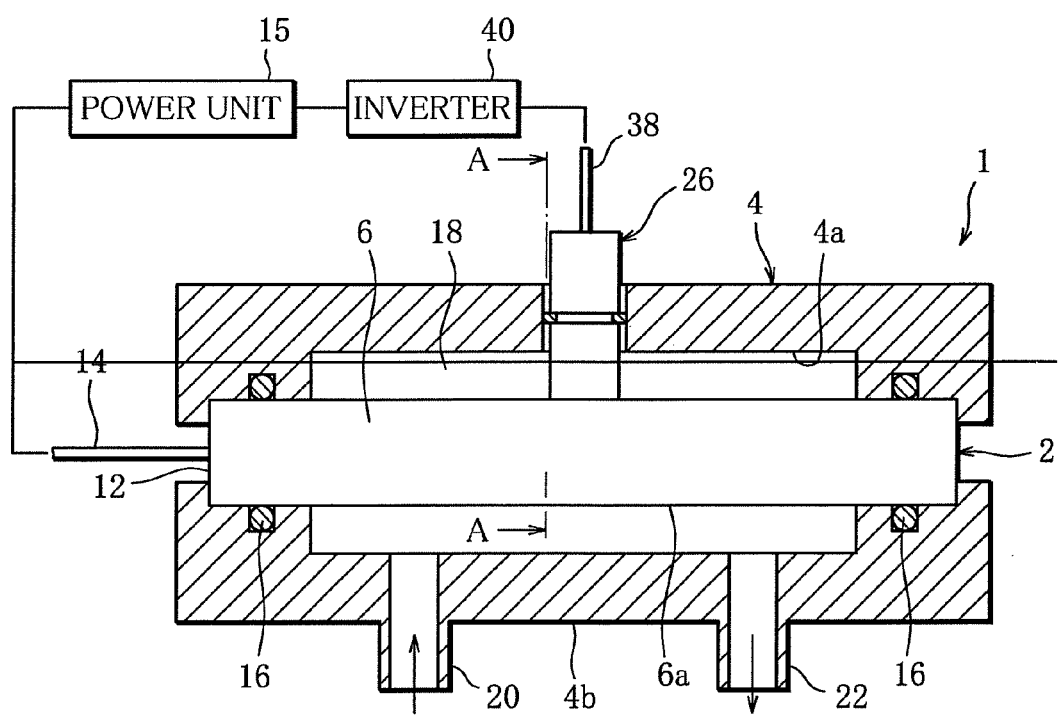
FIG. 1 is a longitudinal sectional view of a heating device in accordance with an embodiment of the present invention.

As shown schematically in FIG. 1, a heating device 1 includes a heater 2 and a case (housing) 4 which contains the heater 2.

Figure 2:
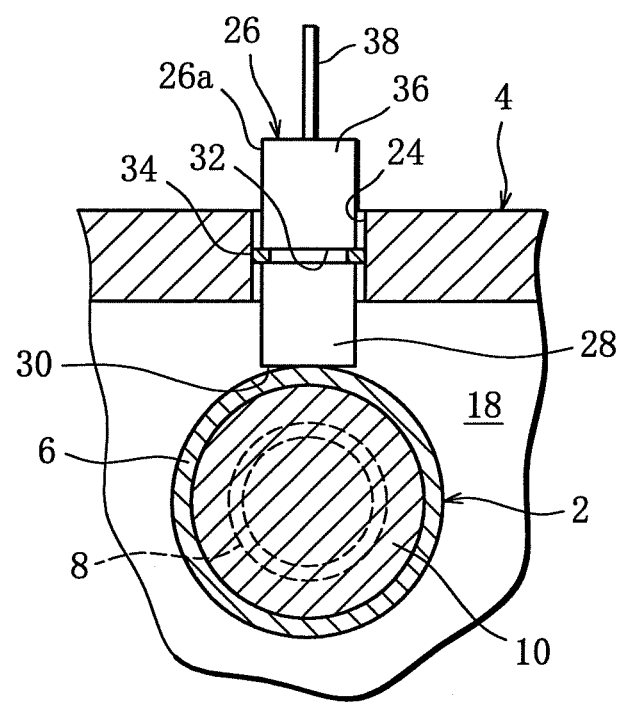
FIG. 2 is a cross-sectional view illustrating a principal part of the heating device taken from line A-A in FIG. 1.

As shown schematically in FIG. 2, the heater 2 is an electrothermal heater which generates heat by energization. The heater 2 is composed of a bottomed cylindrical metal pipe 6 (heating portion). A coiled heating wire 8 such as a nichrome wire is inserted in the metal pipe 6, and a heat-resistant insulating material 10, such as magnesium oxide, having high electrical insulation properties and thermal conductivity is filled into the metal pipe 6 by pressure to seal the heating wire 8.

A terminal 12 molded from silicon, glass and the like by casting is provided at one end opening of the metal pipe 6. A lead wire 14 connected to the heating wire 8 is pulled through the terminal 12. The lead wire 14 and an external power unit 15 electrically connected to the lead wire 14 constitute an energization circuit (not shown) for providing the heating wire 8 with electricity. Although only one heater 2 is shown in FIG. 1, two or more heaters 2 may be provided.

The case 4 is composed of one or more cast bodies. The case 4 contains the heater 2 by airtightly surrounding vicinities of both ends of the metal pipe 6 through O-rings 16. Clearance is created between an inner surface 4a of the case 4 and an outer circumference 6a of the metal pipe 6. The clearance serves as a passage 18 into which a heating medium as a LLC (coolant, antifreeze), such as ethylene glycol, flows. An inlet pipe 20 and an outlet pipe 22 for the heating medium are protrusively provided at appropriate positions on an outer surface 4b of the case 4 so that the both pipes communicate with the passage.

The heating device 1 having such a schematic configuration, which is to be mounted, for example, in a hybrid car, an electric vehicle and the like, is used to heat a coolant or the like circulating through a refrigeration circuit in an air conditioning apparatus for a vehicle, serving as an auxiliary heat source for providing heat to make up a shortage in waste heat out of the engine in the case of a hybrid car, or as an alternative heat source for providing heat in place of the engine that does not exist in the case of an electric vehicle.

For example, in the case of a hybrid car, an LLC circulating in a cooling water circuit (not shown) for cooling an engine flows via the inlet pipe 20 into the passage 18, and the heater 2 heats the LLC. Heat from the LLC which has been heated by the engine and the heating device 1 is used to heat a coolant circulating through a refrigeration circuit provided in an air conditioning apparatus for the vehicle. The heated coolant is used to heat and cool the air in the vehicle cabin. The LLC which has been used for heating the coolant is discharged from the passage 18 via the outlet pipe 22 and returned to the cooling water circuit. Then, the LLC is again used to cool the engine.

According to the present embodiment, a through-hole 24 is bored into the case 4 in a direction perpendicular to the longitudinal direction of the heater 2. A temperature sensor 26 (temperature detection means) for detecting the temperature of a LLC which flows through the passage 18 is inserted in the through-hole 24. The temperature sensor 26 is a roughly cylindrical shaped thermistor. An end face 30 of a temperature measurement end 28 of the sensor 26 comes into contact with the outer circumference 6a of the metal pipe 6 of the heater 2. This enables the temperature sensor 26 to detect not only the temperature of the LLC but also the surface temperature of the metal pipe 6, i.e. the heating portion of the heater 2.

Two annular grooves 32 are formed on a side 26a of the temperature sensor 26. An O-ring 34 is fitted to each annular groove 32. The temperature sensor 26 is airtightly connected to and secured to the through-hole 24 through the O-ring 34.

The temperature sensor 26 is electrically connected to an inverter 40 through a lead wire 38 pulled out of its outer end 36. The inverter 40 controls energization (energization controlling means) by turning on and off the energization of the heater 2 in response to the temperature of the LLC and/or the surface temperature of the metal pipe 6 detected with the temperature sensor 26 through the power unit 15 and the energization circuit described above.

When an LLC exists in the passage 18, the temperature of the LLC is controlled within a proper range by the use of the temperature sensor 26 under this energization control. Thus, the temperature of the heater 2 does not abnormally rise.

On the other hand, conventionally, when no or little LLC exists in the passage 18 due to absence of the LLC supply to the cooling water circuit, a leakage of the LLC from the cooling water circuit or other reasons, there is no or little heating medium for transferring heat from the heater 2. If this happens, the heating device 1 can undergo accidental heating of an empty passage, leading to a trouble that the temperature of the heater 2 itself abnormally rises. Even when such accidental heating of an empty passage occurs, the heating device 1 having the temperature sensor 26, which is out of contact with the metal pipe 6 and capable of detecting only the temperature of the LLC in the case of a conventional heating device, can undergo a deterioration in the responsiveness of the temperature sensor 26 due to the heat-insulation effect of the air surrounding the temperature sensor 26, leading to a delay in the detection of such accidental heating. As a result, temperature in the passage 18 can go on to increase, causing an occurrence of smoke or fire in the heating device 1.

In contrast, the present embodiment provides energization control by taking advantage of a difference in heat transfer property between the LLC as a fluid and the air as a gas, that is, the temperature of the LLC becomes dominant when the LLC exists in the passage 18 and the temperature of the heater 2 becomes dominant when no or little LLC exists in the passage 18, as the temperature sensor 26 is brought into direct contact with the outer circumference 6a of the metal pipe 6, i.e. the heating portion of the heater 2, while the temperature sensor 26 is placed in the passage 18 where the LLC flows.

Figure 3:
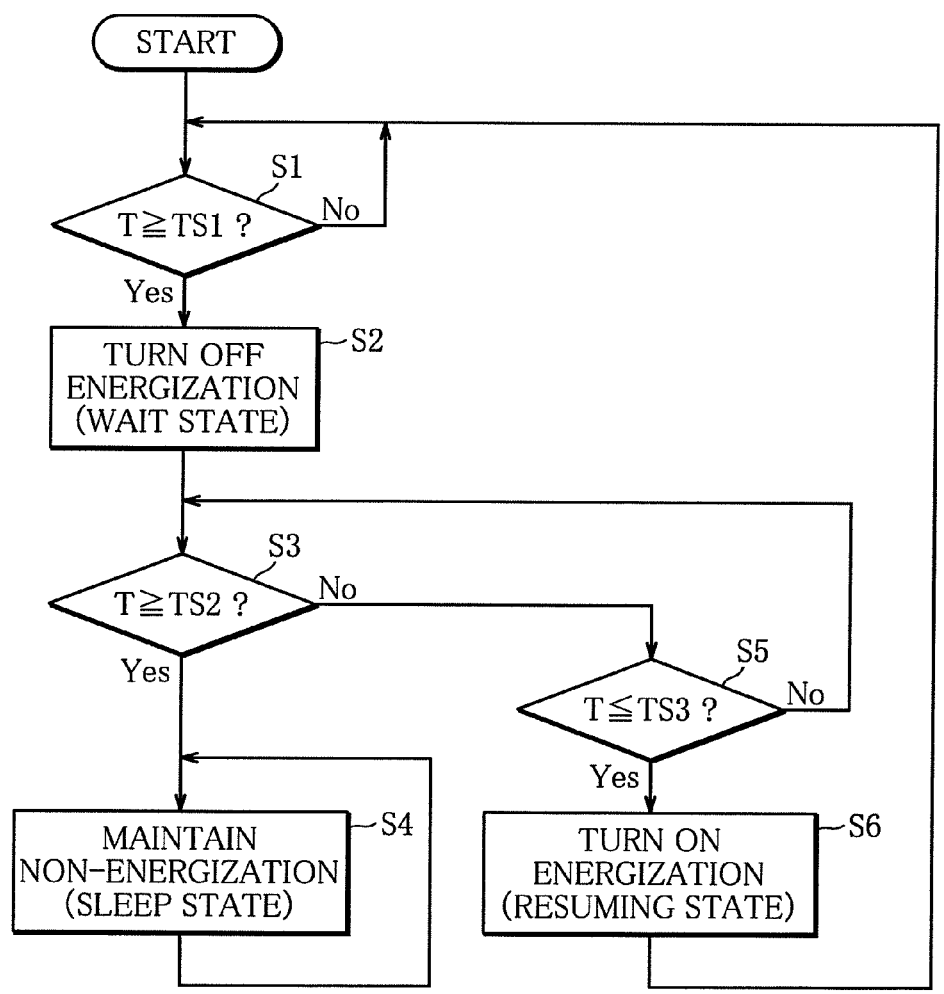
FIG. 3 is a flowchart showing a routine performed by an inverter of FIG. 1 for controlling the energization of a heater.

Energization control performed by the inverter 40 will now be described with reference to the flowchart of FIG. 3 and the diagrams of FIGS. 4 and 5 each chronologically showing a relationship between the energization status of the heater 2 and a temperature T detected with the temperature sensor 26.

When a control routine for the energization control starts upon energization of the heater 2, it is firstly determined whether or not a temperature (temperature inside the housing) T calculated on both the temperature of the LLC in the passage 18 and the surface temperature of the metal pipe 6 detected with the temperature sensor 26 is equal to or greater than a first specified threshold TS1 (step S1).

Figure 4:
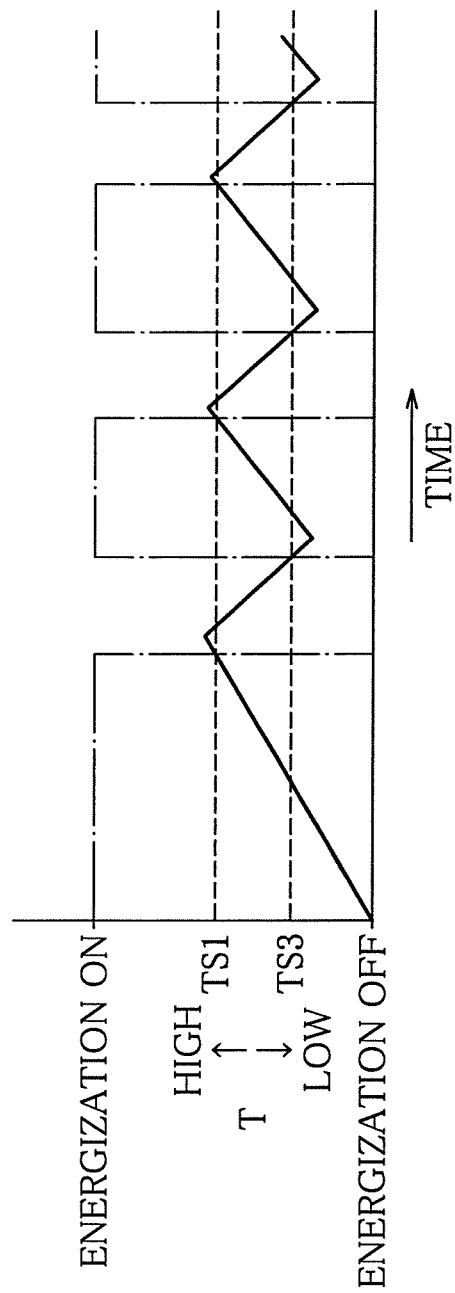
FIG. 4 is a diagram showing a relationship between the energization status of the heater and a temperature T detected with a temperature sensor on a time-series basis while the inverter of FIG. 1 normally controls the energization of the heater.

If the temperature T is evaluated to be true (YES) in the step S1, i.e., the expression T≥TS1 holds true, the inverter 40 turns off the energization of the heater 2 to put the heater 2 in a standby state (a wait state) (step S2) as shown in FIGS. 4 and 5.

If the temperature T is evaluated to be false (NO) in the step S1, i.e., the expression T≥TS1 does not hold true, the inverter 40 maintains the energization of the heater 2 and transitions to the step S1 again as shown in FIGS. 4 and 5.

Next, when the inverter 40 is in the wait state of the step S2, it is determined whether or not the temperature T detected with the temperature sensor 26 is equal to or greater than a second specified threshold TS2 (step S3).

If the temperature T is evaluated to be true (YES) in the step S3, i.e., the expression T≥TS2 holds true, the inverter 40 determines that no LLC exists in the passage 18 or the quantity of the LLC is smaller than a normal level, i.e., the heater 2 is heating an empty passage. Then, as shown in FIG. 5, the heater 2 enters an energization complete stop state (a sleep state) in which the energization of the heater 2 is continuously turned off as a process correcting the abnormally high-temperature state of the heating device 1, and it does not automatically resume a subsequent energization process (step S4).

If the temperature T is evaluated to be false (NO) in the step S3, i.e., the expression T≥TS2 does not hold true, it is determined whether or not the temperature T detected with the temperature sensor 26 in the wait state described above is smaller equal to or than a third specified threshold TS3 (step S5).

If the temperature T is evaluated to be true (YES) in the step S5, i.e., the expression T≤TS3 holds true, the inverter 40 determines that the passage 18 contains a proper quantity of the LLC, and puts the heater 2 in an energization resuming state so as to resume normal energization control by turning on the energization of the heater 2 as shown in FIG. 4 (step S6).

If the temperature T is evaluated to be false (NO) in the step S5, i.e., the expression T≤TS3 does not hold true, the inverter 40 maintains the non-energization of the heater 2 and transitions to the step S3 again as shown in FIG. 4.

In the embodiment described above, a temperature range between the first threshold TS1 and the second threshold TS2 is designated as a range for determining heating of an empty passage. Then, in the standby state (wait state) for energization of the heater 2, the inverter 40 distinguishes accidental heating of an empty passage in the heating device 1 from normal temperature control through the heater 2. If heating of an empty passage is evaluated to be true, the inverter 40 puts the heater 2 in the energization complete stop state (sleep state) in which the energization of the heater 2 is continuously turned off and subsequent energization cannot be automatically resumed.

Moreover, when the temperature T becomes equal to or smaller than the third threshold TS3, the inverter 40 is enabled to put the heater 2 in the energization resuming state by returning from the standby state for energization of the heater 2. The energization control provides normal energization control without unnecessarily stopping the heating device 1 for protection when an LLC exists in the passage 18 while the energization control provides error processing to stop promptly the heating device 1 for protection when no or little LLC exists in the passage 18. Thus, it is possible to provide the heating device 1 that achieves high reliability as it promptly detects accidental heating of an empty passage with high accuracy and prevents reliably an occurrence of smoke or fire while performing normal energization control of the heater 2 by the use of the temperature sensor 26.

The present invention is not limited to the embodiment of the heating device 1 described above, but various modifications may be made.

For example, the heating device 1 according to the present invention is not limited to use in a car air conditioning apparatus of an hybrid car or an electric vehicle, but can be used as a heat source for other purposes.

EXPLANATION OF REFERENCE SIGNS

1 heating device
2 heater
4 case (housing)
6 metal pipe (heating portion)
18 passage
26 temperature sensor (temperature detection means)
40 Inverter (energization controlling means)

The invention claimed is:

1. A heating device comprising:
a heater having a heating portion which generates heat by energization;
a housing which contains the heating portion and forms a passage for a heating medium between the housing and the heating portion;
a temperature detection means inserted in the passage to detect temperature of the heating medium and disposed in contact with the heating portion of the heater to detect surface temperature of the heating portion such that temperature inside the housing is detected based on due to heat of the heating medium and the heating portion; and
an energization controlling means for turning on and off the energization of the heater depending on the temperature inside the housing detected by the temperature detection means,
wherein the energization controlling means turns off energization of the heater to put the heater in an energization standby state if the temperature inside the housing detected by the temperature detection means is equal to or greater than a first specified threshold, the energization controlling means continuously turns off energization of the heater to put the heater in an energization complete stop state if the temperature inside the housing detected in the energization standby state is equal to or greater than a second specified threshold, and the energization controlling means turns on energization of the heater to put the heater in an energization resuming state if the temperature inside the housing detected in the energization standby state is equal to or smaller than a third specified threshold.

* * * * *